July 22, 1969     FUMOTO TSUTSUMI     3,456,517
ENGAGEMENT-TYPE STEPLESS VARIABLE RATIO TRANSMISSION
Filed Jan. 27, 1967     3 Sheets-Sheet 2

INVENTOR
FUMOTO TSUTSUMI

BY Browne, Schuyler & Beveridge

ATTORNEY

July 22, 1969 FUMOTO TSUTSUMI 3,456,517
ENGAGEMENT-TYPE STEPLESS VARIABLE RATIO TRANSMISSION
Filed Jan. 27, 1967 3 Sheets-Sheet 3

INVENTOR
Fumoto Tsutsumi

BY Browne, Schuyler & Beveridge.
ATTORNEY

United States Patent Office 3,456,517
Patented July 22, 1969

3,456,517
ENGAGEMENT-TYPE STEPLESS VARIABLE RATIO TRANSMISSION
Fumoto Tsutsumi, 69, 5-chome, Hondori Sakurazuka, Toyonaka-shi, Japan
Filed Jan. 27, 1967, Ser. No. 612,245
Int. Cl. F16h *15/08, 55/14*
U.S. Cl. 74—199                                             6 Claims

ABSTRACT OF THE DISCLOSURE

An engagement-type stepless variable ratio transmission comprising a driving shaft and a driven shaft on the same centerline, pairs of bevel gears mounted on the driving shaft and on a middle shaft respectively, each pair being arranged face to face with each other, transmission rings secured to one end of the middle shaft and to one end of the driven shaft respectively, each transmission ring having a group of swing plates, and an eccentric cylinder which the middle shaft for up and down movement to change the centerline radii to the mesh points of the sets of swing plates simultaneously, and thereby changes speed in a stepless function of cylinder eccentric adjustment.

---

A friction-type stepless transmission is known in the art. The operation of this transmission is as follows: By turning an eccentric cylinder in which springs and a middle cone shaft etc. are located and which acts on two pairs of single side friction secondary ring, the middle cone shaft is moved up and down, and the radii to the points of contact are changed.

In such a conventional transmission, power is transmitted by contact and friction between a metal and plastic. Said conventional transmission has defects in that it is apt to be slipped, is not durable and tends to be elongated in a direction of its shaft. What is more, its mechanism is very complicated.

This invention relates to an engagement-type stepless variable ratio transmission by means of bevel gears in an oil tank. It will not slip, is compact, and has many other advantages which may be described hereinafter.

The object of this invention is to provide, by means of bevel gears arranged face to face with each other, an engagement-type stepless variable ratio transmission which can smoothly and accurately change speed without any danger of slipping which is inherent in a conventional apparatus making use of contact and friction.

Figure 1:
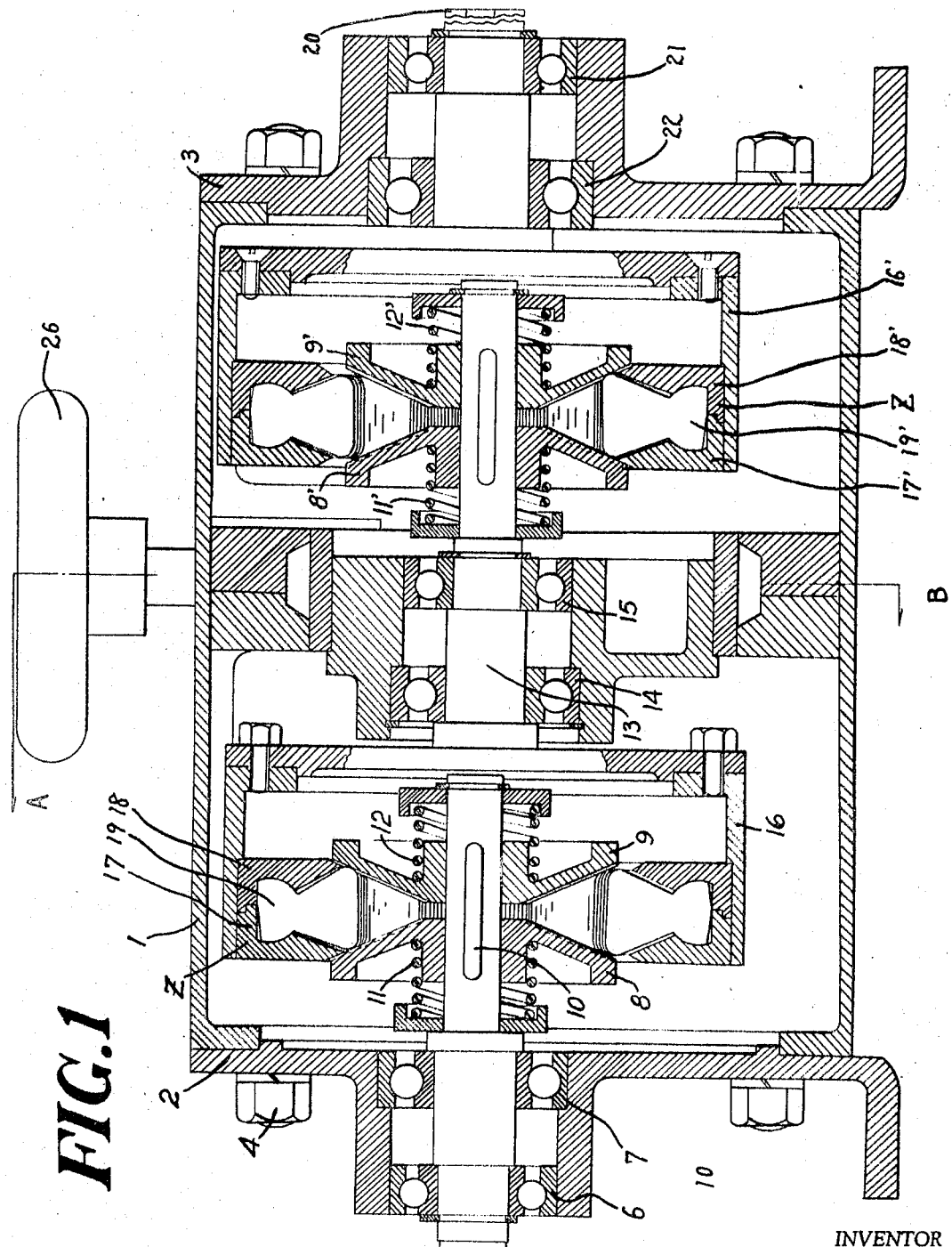
FIGURE 1 is a cross-sectional view of apparatus embodying my invention.
Figure 2:
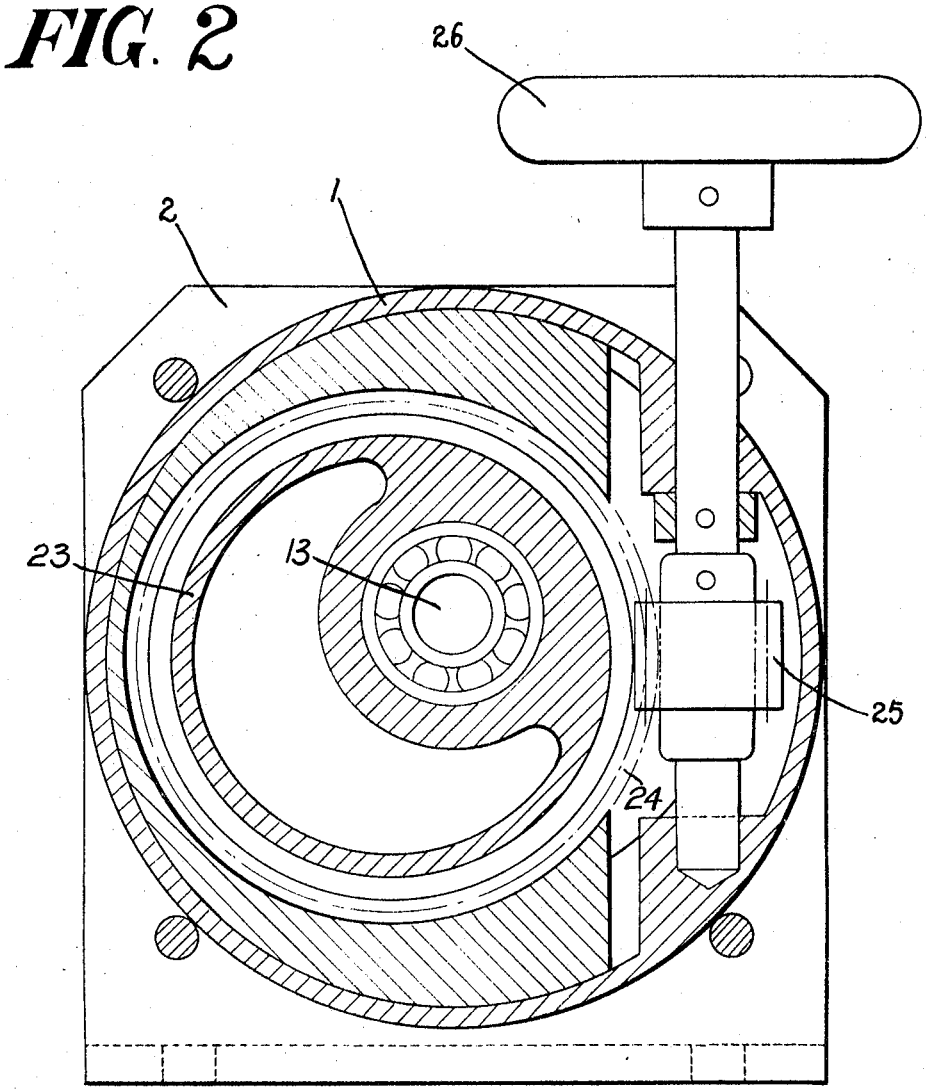
FIGURE 2 is a sectional view taken along the line A–B in FIGURE 1.

As may be seen from FIGURE 1, side covers 2 and 3 of a casing 1 are respectively secured by through bolts 4. A driving shaft 5 is supported by ball bearings 6 and 7, and bevel gears 8 and 9 are keyed to the driving shaft 5 by means of a key 10, so that paired bevel gears 8 and 9 and the driving shaft 5 rotate together, the bevel gears being mounted on the driving shaft 5 in such a manner as to be slidable axially, and are pressed together along shaft 5 by axial springs 11 and 12.

A middle shaft 13 is supported, e.g., centrally, by ball bearings 14 and 15. At one end of middle shaft 13 there is a transmission ring Z mounted concentrically on shaft 13 by flange-attached cylinder 16. Said transmission ring Z comprises a number of radially arranged thin triangular coupling or swing plates 9 held by side rings 17 and 18.

At the other end of the middle shaft 13 there are bevel gears 8' and 9' arranged to face each other. Said bevel gears are mounted on the middle shaft 13 in such a manner as to be slidable axially while they are being rotated, and are pressed into engagement with plates 19 by springs 11' and 12'. The driven shaft 20 is supported by ball bearings 21 and 22. The extreme portion of the driven shaft 20 is provided with a concentric flange-mounted, cylinder 16' in which a transmission ring Z' is arranged similar to ring Z. An eccentric cylinder 23 is mounted with an axis parallel to shafts 10 and 20 adjustably off-center in housing 1. On the outer circumference of cylinder 23 there is provided a worm wheel 24, which meshes with a worm 25, and is rotated by means of a handle 26. Since middle shaft 13 is journaled in cylinder 23 on an axis located at some distance from the center a considerable adjust of position of shaft 13 is effected by adjustment of handles 26.

Figure 3:
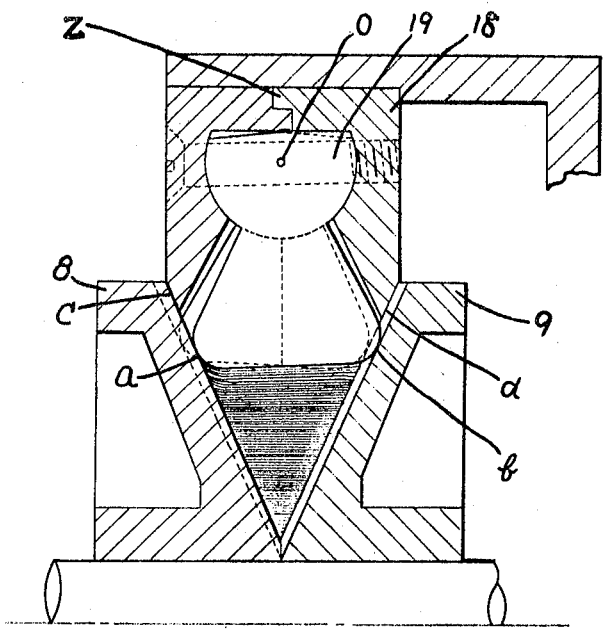
FIGURES 3, 4 and 5 are illustrative views of important parts of the apparatus embodying my invention.
Figure 4:
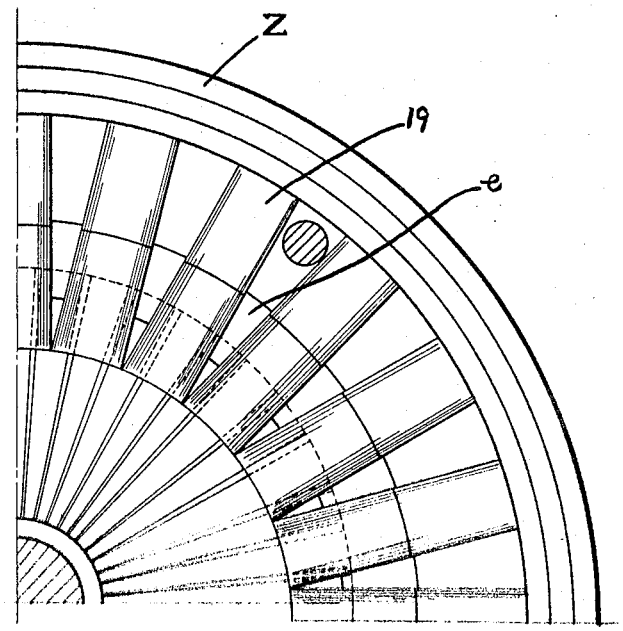
Figure 5:
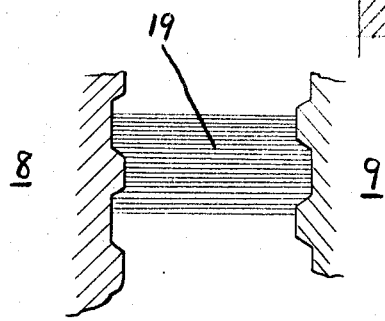

As shown in FIGURES 3, 4 and 5, the bevel gears 8 and 9 have generally radial teeth located on conical faces and their grooves are relatively shallow with a fixed depth and a width gradually increasing toward their outer circumferences.

The grooves or teeth valleys of each gear face the tops or crests of teeth of the opposite gear, grooves and crests of the gears being thus in correspondingly opposed positions for the two gears of the pair as shown particularly in FIG. 5.

A group of swing plates are mounted within transmission ring Z and comprise a number of thin, generally triangular steel plates, and are adapted by shaping to conform with holding means in ring Z to swing easily from left to right and vice versa about points O as centers being laterally rotative within limits about fixed points in a circle within ring Z, and having extending rounded lateral edges for engaging both beveled gears 8 and 9.

Rotation of ring Z relative to 8 and 9 is prevented by the engagement of portions *c* and *d* at the free ends of swing plates 19 with gears 8 and 9. The extreme portions *c* and *d* of hollowed out rings 17 and 18, which comprise the transmission ring Z, and/or protruding portions of plates 19 at *c* and *d* forceably open bevel gears 8 and 9 against pressure of springs 11 and 12 when shaft 13 is translated out of alignment with shafts 5 and 20; and as the individual plates 19 of a group are easily able to swing from left to right, and extend inwardly beyond the enclosing rings 17 and 18, they are adapted to be simultaneously meshed with adjacent teeth of both bevel gears at all times regardless of eccentricity of adjustment relative to shaft 10, and thus completely couple the bevel gears on both sides, and are thereby able to transmit rotary force from shaft 10 to shaft 13. Ring Z' is similar to ring Z and encloses swing plates 19', like plates 19, for engagement with bevel gears 8' and 9' mounted on an extension of shaft 13 between springs 11' and 12'. Cylinder 16' is flange mounted on shaft 20 for driving shaft 20 when gears 8', 9' are driven by shaft 13. Shaft 5 thus drives shaft 20 through ring Z' by coupling gears 8, 9 to 8', 9' by way of middle shaft 13 and ring Z. Output shaft torque or speed is accordingly controlled at all times by meshed gearing in which the gear ratio is smoothly controllable according to effective radius of contact between driving gears and swing plates of rings Z and Z'.

Speed change can be effected as follows: when the driving shaft 5 is rotated at a constant speed by means of a motor (not shown in the drawings) gears 8, 9 operate at the same speed. When the handle 26 is turned, the middle shaft 13 moves downwardly by means of the eccentric cylinder 23, and the transmission ring Z forcibly opens the bevel gears 8 and 9 against the pressing of the springs 11 and 12 as portions *c* and *d* of the hollowed-out rings 17 and 18 move downwardly. Bevel gears 8' and 9' advance downwardly so that the transmission ring Z' similarly separate gears 8' and 9'. By this operation, the radius of the mesh points of the bevel gears 8 and 9 with the transmission ring Z, and the radius of the mesh points of the bevel gears 8' and 9' with the transmission ring Z' are simultaneously changed, and so effect a double stepless variable ratio speed change. In other words, a constant rotation is transmitted from the driving shaft 5, and is reduced (or increased) in an infinitely variable ratio by means of the bevel gears 8 and 9 and the transmission ring Z, thence through the middle shaft, and again reduced (or increased) in an infinitely variable ratio by means of the bevel gears 8' and 9' and the transmission ring Z', and thence transmitted to the driven shaft 20.

The apparatus of this invention differs from a conventional friction stepless transmission in that it is a positive gear meshing not subject to frictional slippage. As the apparatus of the present invention is an engagement-type stepless variable ratio transmission, it requires no great thrust force, and is very durable. The apparatus has also a good transmission efficiency because it does not slip. Without the necessity of fitting up a special reduction mechanism, it can reduce the rotating speed of a motor to a small fraction of the drive speed. It can be applied to a general-purpose machine. When applying to transmission gear of an auto-bicycle as an example of the general-purpose machine, only a single speed change system will be sufficient. Besides, as the driving shaft and the driven shaft are able to be located on the same center line, there are many advantages in applying it.

Many variations of the invention are contemplated within the scope of the appended claims. For example, in the case side pressure on the beveled gears by springs alone is insufficient, cams which move bodily with the beveled gears may be used, such as a cam fastened to the driving shaft by a pin and another cam fastened to the middle shaft by another pin thus to increase the side pressure with the increase of load to prevent disengagement of the swing plates from the gears with which they mesh.

I claim:
1. A positive engagement stepless variable ratio transmission device, comprising:
   a housing and a driving and a driven shaft bearing in said housing for rotation about parallel axes,
   a pair of similar bevel gears mounted face to face on said driving shaft keyed for rotation therewith and being slideably positioned therealong,
   means urging said gears toward each other,
   an intermediate shaft mounted for rotation within said housing about an axis parallel to the axis of said driving shaft,
   eccentric mounting means supporting said intermediate shaft for translative adjustment of the shaft axis with respect to the axis of said driving shaft,
   means adjustably fixing the position of said intermediate shaft as adjusted,
   a second pair of bevel gears arranged face to face on one end of said intermediate shaft being keyed for rotation therewith and slideable therealong,
   means urging last said gears toward each other during rotation thereof,
   first ring means concentrically attached in driving relation to said intermediate shaft having an internal diameter approximating the diameter of first said bevel gears and a thickness not exceeding the peripheral opening therebetween,
   swing plate means arranged parallel to and substantially concentric with one said axis and extending inwardly from said ring means for engaging said bevel gears,
   said plate means being rotatable about respective centers circularly arranged in said ring means to be concentric with said axis, whereby said plate means effectively couple said bevel gears to said intermediate shaft,
   second ring means secured concentrically with said driven shaft having an inner opening not smaller than the diameter of said second bevel gears and having mounted therein swing plate means extending inwardly for engagement with said second bevel gears being mounted parallel to said driven shaft and movable parallel thereto about points of rotation arranged on a circle concentric with the driven shaft,
   said second ring means being of thickness not exceeding the space between the periphery of said second gears.

2. A positively coupled transmission having driving and driven shafts operative over continuously varying speed ratios, comprising:
   housing means supporting said shafts for rotation about a common axis,
   a middle shaft supported for rotation about an axis parallel to said shafts,
   means for translating said axis of rotation upwardly and downwardly with respect to said driving shaft,
   means coupling said driving and middle shafts at a varying ratio, including:
      a first pair of like bevel gears arranged face to face with crests of one gear opposite grooves of the other for like rotation with the driving shaft and slideable therealong,
      means urging said gears toward each other along the shaft,
      first hollow ring means fixedly attached to said middle shaft in concentric driving relation thereto, said ring means having an inner diameter of a size to receive therein said bevel gears,
      rotary force conveying means comprising a set of radially arranged flat-faced plates closely positioned within said ring for mutual contact along inner edges thereof which extend inwardly from the ring for contact with said gears, being mounted in said ring for adjusting movement to contact cretsts of one gear and grooves of the other gear simultaneously for coupling driving force from the gears to the ring,
   means coupling said middle shaft to said driven shaft at a varying ratio, including a second pair of gears functionally like said first pair slideably attached to the middle shaft and second ring means functionally like said first ring means secured in concentric driving relation to said driven shaft being coupled to said second pair of gears by a second set of flat faced plates positioned for contact variably along the faces of the second pair of gears.

3. A transmission according to claim 2, said means for translating the axis of rotation comprising a cylinder mounted in said housing means having therein an eccentrically mounted bearing supporting said middle shaft, and means for rotating said cylinder to eccentrically translate said middle shaft for adjustment of said ratios.

4. A transmission according to claim 2, said means for translating said axis comprising a pair of bearings supporting the middle shaft and mounted for adjusting movement perpendicular to said axis whereby said first hollow ring means positions said flat-faced plates therein for contact with said first beveled gears at decreasing gear radius while said second set of plates contact faces of gears of said second pair at correspondingly decreasing radius.

5. A positively coupled gear ratio adjusting mechanism for coupling a driving shaft to a driven shaft supported in parallel relation emergent at opposite ends of a housing, comprising:
   a middle shaft supported for rotation within the housing between said driving and driven shafts,
   a first pair of face to face conical bevel gears rotatively keyed to said middle shaft for longitudinal adjustment therealong against a biasing force,
   a second pair of face to face conical bevel gears rotatively keyed to said driving shaft for longitudinal adjustment therealong against a biasing force,
   hollowed-out ring means drivingly secured to said middle shaft at one end thereof and having an inner diameter to receive therein said second pair of gears,
hollowed-out ring means drivingly secured to said driven shaft and having an inner diameter to receive therein said first pair of gears,
swing plate means comprising a group of similar plates supported at each said ring means for limited movement longitudinally in respect to the driven shaft and extending radially inwardly from said inner diameter into contact with crests and grooves of a pair of gears thereat for coupling the pairs of gears to said ring means, respectively, and
means adjusting the lateral position of said middle shaft relative to driving and driven shafts effecting variable radius connection to said gears thereon and said gears on said driving shaft as said plates of each ring means are caused to separate said gears thereat against said bias forces.

6. A mechanism according to claim 5, wherein said swing plate means comprise plates arranged in substantial mutual side to side contact at the inner ends thereof adjacent to contact with said gears.

References Cited

UNITED STATES PATENTS

| | | | |
|---|---|---|---|
| 2,686,432 | 8/1954 | Bergmann | 74—461 |
| 2,774,254 | 12/1956 | Gerber | 74—461 |
| 3,381,544 | 5/1968 | Butler | 74—461 |
| 2,308,090 | 1/1943 | MacFarren | 74—190 |
| 2,714,825 | 1/1955 | Ferrari | 74—689 |
| 2,815,670 | 12/1957 | Jorgensen | 74—199 |
| 3,175,410 | 3/1965 | Dittrich et al. | |

FOREIGN PATENTS 820,087  11/1937  France.

ARTHUR T. McKEON, Primary Examiner

U.S. Cl. X.R.

74—461